(12) United States Patent
Countryman et al.

(10) Patent No.: US 6,250,770 B1
(45) Date of Patent: Jun. 26, 2001

(54) PLANTER AND LIGHT ASSEMBLY

(76) Inventors: Frederick L. Countryman; Belva M. Countryman, both of 312 Locust Dr., Lake in the Hills, IL (US) 60102

( * ) Notice: Subject to any disclaimer, the term of this patent is extended or adjusted under 35 U.S.C. 154(b) by 0 days.

(21) Appl. No.: 09/544,446

(22) Filed: Apr. 7, 2000

(51) Int. Cl.⁷ .................................................. F21S 6/00
(52) U.S. Cl. ......................... 362/122; 362/154; 362/805
(58) Field of Search ................................ 362/122, 123, 362/154, 805

(56) References Cited

U.S. PATENT DOCUMENTS

| | | |
|---|---|---|
| D. 322,046 | 12/1991 | Woods . |
| D. 396,019 | 7/1998 | Moss et al. . |
| 4,349,864 | 9/1982 | Smith . |
| 4,594,646 * | 6/1986 | Kohorn et al. ............... 362/805 X |
| 4,646,209 * | 2/1987 | Jansen ............................ 362/122 |
| 4,845,602 | 7/1989 | Lehocki . |
| 4,980,807 * | 12/1990 | Kohorn .......................... 362/122 |
| 5,741,061 | 4/1998 | Lehmann et al. . |
| 5,879,071 | 3/1999 | Sanford, Jr. . |

* cited by examiner

Primary Examiner—Stephen Husar

(57) ABSTRACT

A planter and light assembly for providing light from a suspended planter. The planter and light assembly includes a planter. The planter comprises a generally hollow housing having an open top side and an open bottom side. The planter has a top edge, a bottom edge and a peripheral wall, which is integrally coupled with and extends between the top and bottom edges. A dividing wall divides the planter into a top portion and a bottom portion. The dividing wall extends across an interior portion of the planter. A light socket for receiving a light bulb is fixedly coupled to a bottom side of the dividing wall. A hanging means hangs the planter from the ceiling, post or other elevated structure. A power supply is operationally coupled to the light socket.

7 Claims, 5 Drawing Sheets

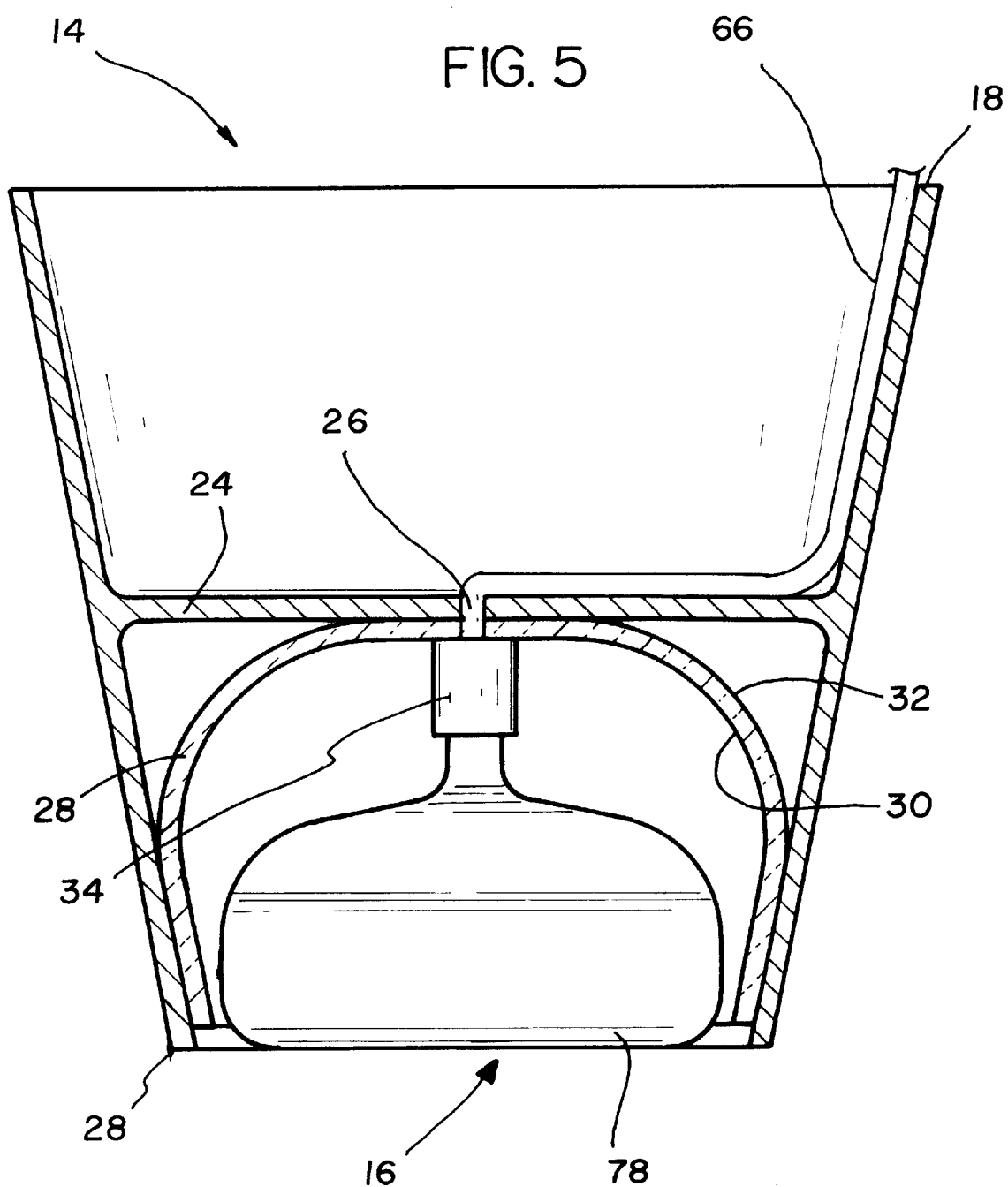

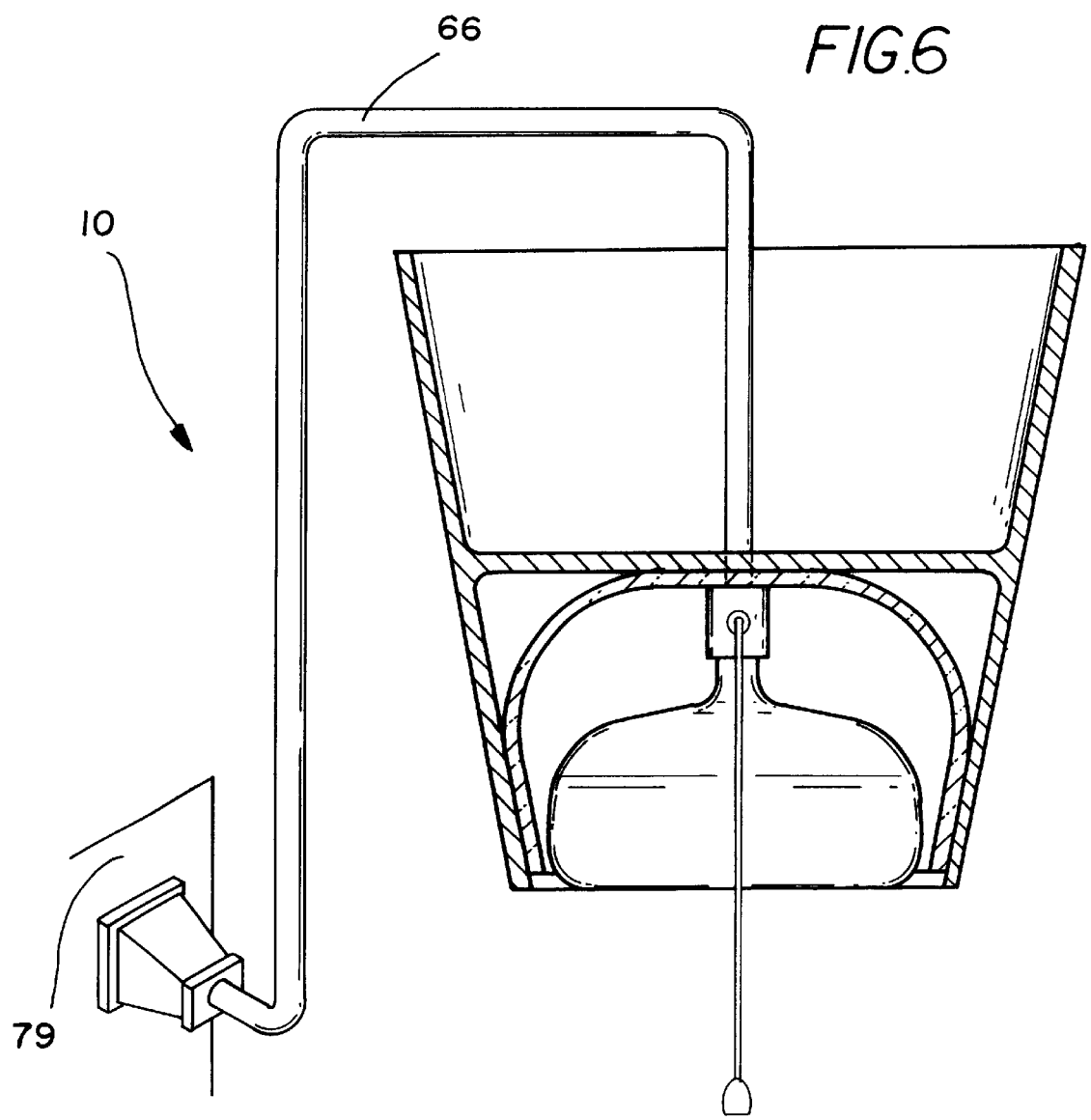

PLANTER AND LIGHT ASSEMBLY

BACKGROUND OF THE INVENTION

1. Field of the Invention

The present invention relates to planters and more particularly pertains to a new planter and light assembly for providing light from a suspended planter.

2. Description of the Prior Art

The use of planters is known in the prior art. More specifically, planters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,845,602; U.S. Pat. No. 5,879,071; U.S. Pat. No. 5,741,061; U.S. Pat. No. 4,349,864; U.S. Des. Pat. No. 322,046; and U.S. Des. Pat. No. 396,019.

While these devices fulfill their respective, particular objectives and requirements, the aforementioned patents do not disclose a new planter and light assembly. The inventive device includes a planter. The planter comprises a generally hollow housing having an open top side and an open bottom side. The planter has a top edge, a bottom edge and a peripheral wall, which is integrally coupled with and extends between the top and bottom edges. A dividing wall divides the planter into a top portion and a bottom portion. The dividing wall extends across an interior portion of the planter. A light socket for receiving a light bulb is fixedly coupled to a bottom side of the dividing wall. A hanging means hangs the planter from the ceiling, post or other elevated structure. A power supply is operationally coupled to the light socket.

In these respects, the planter and light assembly according to the present invention substantially departs from the conventional concepts and designs of the prior art, and in so doing provides an apparatus primarily developed for the purpose of providing light from a suspended planter.

SUMMARY OF THE INVENTION

In view of the foregoing disadvantages inherent in the known types of planters now present in the prior art, the present invention provides a new planter and light assembly construction wherein the same can be utilized for providing light from a suspended planter.

The general purpose of the present invention, which will be described subsequently in greater detail, is to provide a new planter and light assembly apparatus and method which has many of the advantages of the planters mentioned heretofore and many novel features that result in a new planter and light assembly which is not anticipated, rendered obvious, suggested, or even implied by any of the prior art planters, either alone or in any combination thereof.

To attain this, the present invention generally comprises a planter. The planter comprises a generally hollow housing having an open top side and an open bottom side. The planter has a top edge, a bottom edge and a peripheral wall, which is integrally coupled with and extends between the top and bottom edges. A dividing wall divides the planter into a top portion and a bottom portion. The dividing wall extends across an interior portion of the planter. A light socket for receiving a light bulb is fixedly coupled to a bottom side of the dividing wall. A hanging means hangs the planter from the ceiling, post or other elevated structure. A power supply is operationally coupled to the light socket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new planter and light assembly apparatus and method which has many of the advantages of the planters mentioned heretofore and many novel features that result in a new planter and light assembly which is not anticipated, rendered obvious, suggested, or even implied by any of the prior art planters, either alone or in any combination thereof.

It is another object of the present invention to provide a new planter and light assembly which may be easily and efficiently manufactured and marketed.

It is a further object of the present invention to provide a new planter and light assembly which is of a durable and reliable construction.

An even further object of the present invention is to provide a new planter and light assembly which is susceptible of a low cost of manufacture with regard to both materials and labor, and which accordingly is then susceptible of low prices of sale to the consuming public, thereby making such planter and light assembly economically available to the buying public.

Still yet another object of the present invention is to provide a new planter and light assembly which provides in the apparatuses and methods of the prior art some of the advantages thereof, while simultaneously overcoming some of the disadvantages normally associated therewith.

Still another object of the present invention is to provide a new planter and light assembly for providing light from a suspended planter.

Yet another object of the present invention is to provide a new planter and light assembly which includes a planter. The planter comprises a generally hollow housing having an open top side and an open bottom side. The planter has a top edge, a bottom edge and a peripheral wall, which is integrally coupled with and extends between the top and bottom edges. A dividing wall divides the planter into a top portion and a bottom portion. The dividing wall extends across an interior portion of the planter. A light socket for receiving a light bulb is fixedly coupled to a bottom side of the dividing wall. A hanging means hangs the planter from the ceiling, post or other elevated structure. A power supply is operationally coupled to the light socket.

Still yet another object of the present invention is to provide a new planter and light assembly that may be hung over an area for providing light to that area.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic cross-sectional view of the present invention.

FIG. 6 is a schematic cross-sectional view of the present invention.

DESCRIPTION OF THE PREFERRED EMBODIMENT

Figure 1:
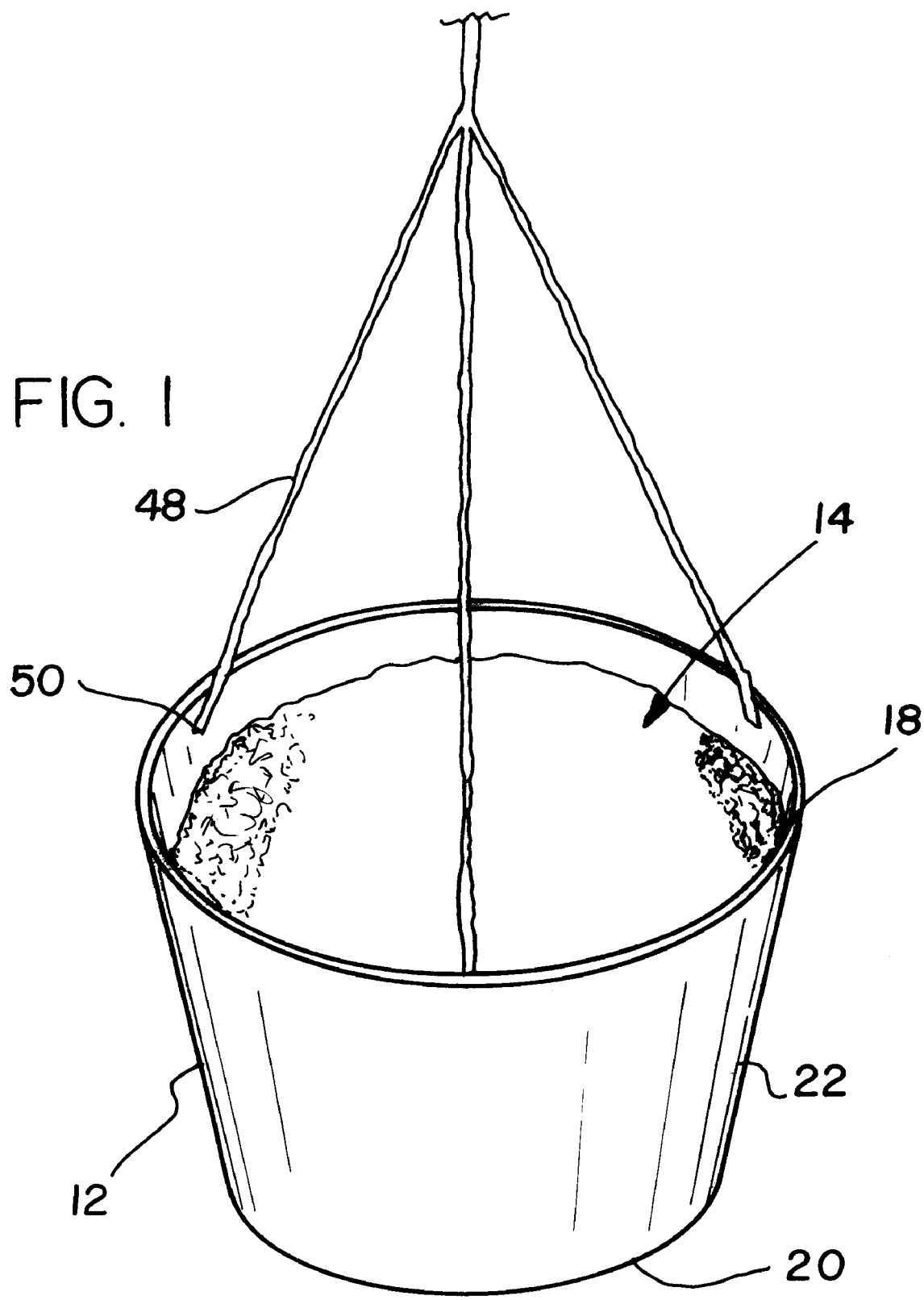
FIG. 1 is a schematic perspective view of the planter of a new planter and light assembly according to the present invention.
Figure 2:
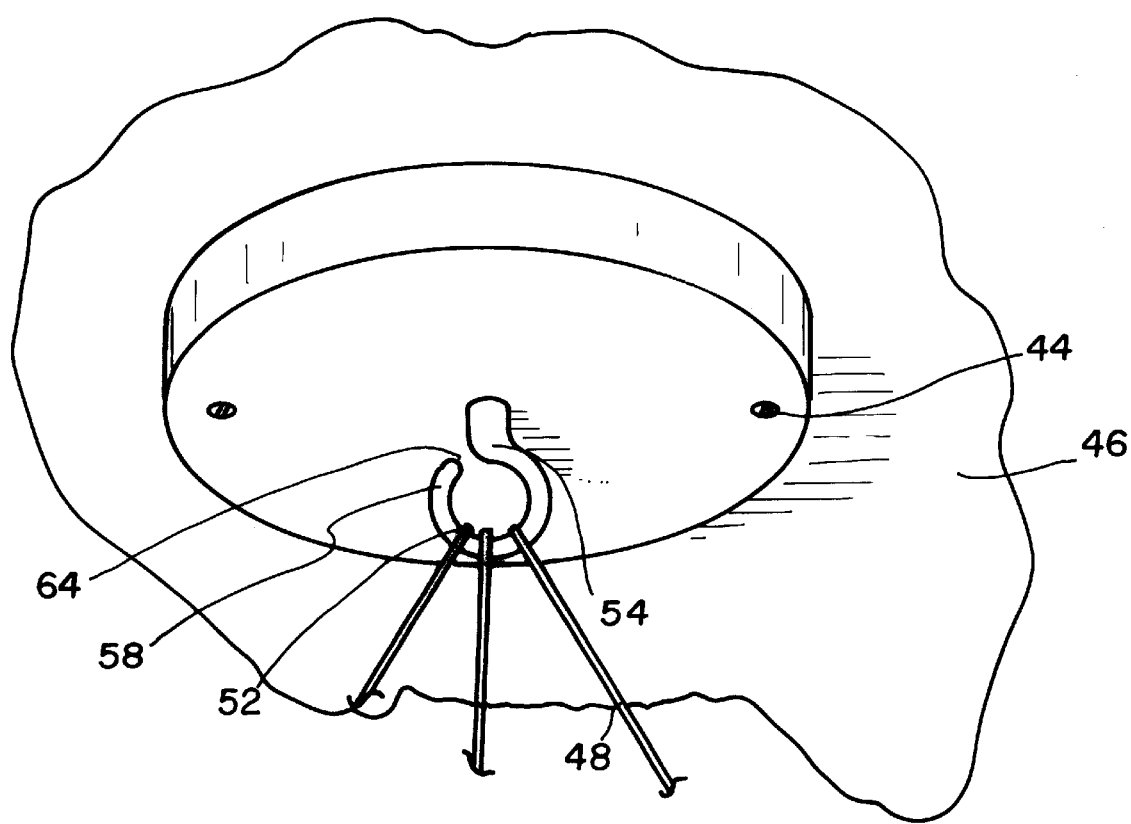
FIG. 2 is a schematic perspective view of the hanging means of the present invention.
Figure 3:
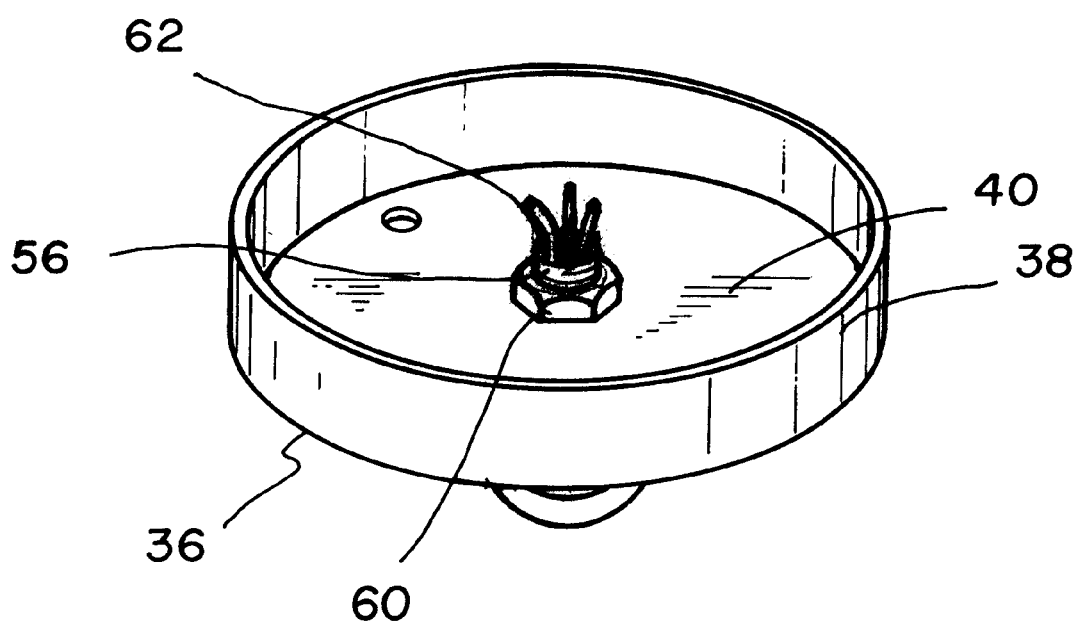
FIG. 3 is a schematic perspective view of hanging means of the present invention.
Figure 4:
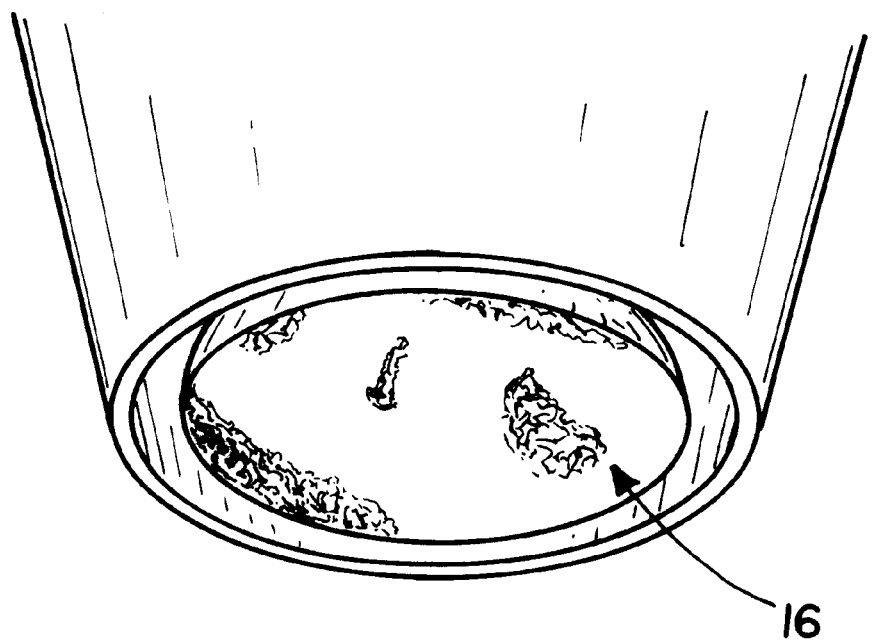
FIG. 4 is a schematic perspective view of the bottom of the planter of the present invention.

With reference now to the drawings, and in particular to FIGS. 1 through 6 thereof, a new planter and light assembly embodying the principles and concepts of the present invention and generally designated by the reference numeral 10 will be described.

As best illustrated in FIGS. 1 through 6, the planter and light assembly 10 generally comprises a planter 12. The planter 12 comprises a generally hollow housing having an open top side 14 and an open bottom side 16. The planter has a top edge 18, a bottom edge 20 and a peripheral wall 22 is integrally coupled with and extends between the top and bottom edges. The planter 12 ideally has a frusto-conical shape. A dividing wall 24 divides the planter into a top portion and a bottom portion. The dividing wall 24 extends across an interior portion of the planter 12 and is integrally coupled to an interior surface of the peripheral wall 22. The dividing wall 24 is positioned generally between the top 18 and bottom 20 edges. The top edge 18 lies in a plane orientated generally parallel to a plane of the dividing wall 24. The dividing wall 24 has an aperture 26 therein.

A light reflecting means 28 reflects light away from the dividing wall 24. The light reflecting means 28 has a concave side 30 and a convex side 32. The convex side 32 is fixedly coupled to a bottom side of the dividing wall 24 such that the concave side 30 is directed toward the bottom edge 20 of the planter 12. The aperture 26 in the dividing wall 26 extends through the light reflecting means 28. The light reflecting means also helps to direct hear from the light bulb 78 away from the dividing wall 24.

A light socket 34 receives the light bulb 78. The light socket 34 is fixedly coupled to a bottom side of the light reflecting means 28. The light socket 34 is generally positioned over the aperture 26.

A hanging means for hanging the planter 12 includes a plate 36. The plate 36 has a peripheral edge having a lip 38 integrally coupled thereto. The plate 36 has an interior surface 40 bounded by the peripheral lip 38. The plate 36 has a central portion having an opening, not shown, therein. A fastening means 44 removably fastens the plate 36 to the ceiling 46 such that the interior surface 40 faces the ceiling 46. The fastening means 44 preferably comprises a pair of screws.

A plurality of elongate flexible members 48, each has a first end 50 and a second end 52. Each of the first ends 50 is fixedly coupled to the interior surface of the peripheral wall 22 and positioned generally adjacent to the top edge 18. The elongate flexible members 48 are preferably cord, rope or cable.

A securing means 54 removably secures each of the elongate flexible members 48 to the plate 36. The securing means 54 has a distal portion 56 and a proximal portion 58. The distal portion 56 has a threaded exterior surface, which is removably insertable in the opening in the plate 36. A nut portion 60 is coupled to the threaded exterior surface of the distal portion 56 to hold the distal portion 56 in place. In the embodiment depicted in FIG. 3, the distal portion 56 has bore 62 therein such that a power supply may travel therethrough. The proximal portion 58 comprises an annular member having a break 64 therein. The break 64 is positioned generally adjacent to the distal portion 56. The second ends 52 of the elongate flexible members 48 are removably coupled to the proximal portion 58 of the securing means 54. Should the planter 12 be placed on a glass shelf, the elongate flexible members 48 are not needed.

A power supply 66 extends through the securing means 54 and through the aperture 26 through the dividing wall 24. The power supply 66 is operationally coupled to the light socket 34. The power supply 66 is a conventional cord which may be interwoven into the elongate flexible members 48 as would be done in FIG. 3, or it may travel by itself through the dividing wall as is shown in FIG. 6.

In use, the planter 12 is used like any conventional planter. It is hung above an area where light is desired. The top portion of the planter 12 holds a plant, either real or artificial, and the bottom portion holds a light bulb 78, which may be wired into the ceiling 46 or operationally coupled to a conventional plug-in 79.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hanging planter and light assembly for hanging from a ceiling, said assembly comprising:

a planter, said planter comprising a generally hollow housing having an open top side and an open bottom side, said planter having a top edge, a bottom edge and a peripheral wall being integrally coupled with and extending between said top and bottom edges, a dividing wall for dividing said planter into a top portion and a bottom portion extending across an interior portion of said planter;

a light socket for receiving a light bulb, said light socket being fixedly coupled to a bottom side of said dividing wall;

a hanging means for hanging said planter; and a power supply, said power supply being operationally coupled to said light socket.

2. The hanging planter and light assembly as in claim 1, further comprising:

a light reflecting means for reflecting light away from said dividing wall, said light reflecting means having a concave side and a convex side, said light reflecting means being positioned between said light socket and said dividing wall, said convex side being fixedly coupled to a bottom side of said dividing wall such that said concave side is directed toward said bottom edge of said planter.

3. The hanging planter and light assembly as in claim 1, wherein said hanging means comprises:

a plate, said plate having a peripheral edge having a lip integrally coupled thereto, said plate having an interior surface bounded by said peripheral lip, said plate having a central portion having an opening therein, a fastening means removably fastens said plate to the ceiling such that said interior surface faces the ceiling;

a plurality of elongate flexible members, each of said elongate flexible members having a first end and a second end, each of said first ends being fixedly coupled to said interior surface of said peripheral wall and positioned generally adjacent to said top edge;

a securing means for removably securing each of said elongate flexible members to said plate, said securing means having a distal portion and a proximal portion, said distal being extending through and removably coupled to said opening in said plate, said second ends of said elongate flexible members being removably coupled to said proximal portion of said securing means.

4. A hanging planter and light assembly, said assembly comprising:

a planter, said planter comprising a generally hollow housing having an open top side and an open bottom side, said planter having a top edge, a bottom edge and a peripheral wall being integrally coupled with and extending between said top and bottom edges, a dividing wall for dividing said planter into a top portion and a bottom portion extending across an interior portion of said planter;

a light socket for receiving a light bulb, said light socket being fixedly coupled to a bottom side of said dividing wall; and a power supply, said power supply being operationally coupled to said light socket.

5. A hanging planter and light assembly as in claim 4, wherein said planter further comprises:

said dividing wall having an aperture therein;

said light socket being generally positioned over said aperture; said a power supply, said power supply extending through said aperture in said dividing wall, said power supply being operationally coupled to said light socket.

6. A hanging planter and light assembly as in claim 5, further comprising:

a light reflecting means for reflecting light away from said dividing wall, said light reflecting means having a concave side and a convex side, said convex side being fixedly coupled to a bottom side of said dividing wall such that said concave side is directed toward said bottom edge of said planter, said aperture in said dividing wall extending through said light reflecting means; and said light socket being fixedly coupled to a bottom side of said light reflecting means, said light socket being generally positioned over said aperture.

7. A hanging planter and light assembly for hanging from a ceiling, said assembly comprising:

a planter, said planter comprising a generally hollow housing having an open top side and an open bottom side, said planter having a top edge, a bottom edge and a peripheral wall being integrally coupled with and extending between said top and bottom edges, a dividing wall for dividing said planter into a top portion and a bottom portion extending across an interior portion of said planter, said dividing wall being integrally coupled to an interior surface of said peripheral wall, said dividing wall being positioned generally between said top and bottom edges, said top edge lying in a plane orientated generally parallel to a plane of said dividing wall, said dividing wall having an aperture therein;

a light reflecting means for reflecting light away from said dividing wall, said light reflecting means having a concave side and a convex side, said convex side being fixedly coupled to a bottom side of said dividing wall such that said concave side is directed toward said bottom edge of said planter, said aperture in said dividing wall extending through said light reflecting means;

a light socket for receiving a light bulb, said light socket being fixedly coupled to a bottom side of said light reflecting means, said light socket being generally positioned over said aperture;

a hanging means for hanging said planter, said hanging means comprising:

a plate, said plate having a peripheral edge having a lip integrally coupled thereto, said plate having an interior surface bounded by said peripheral lip, said plate having a central portion having an opening therein, a fastening means removably fastens said plate to the ceiling such that said interior surface faces the ceiling, said fastening means comprising a pair of screws;

a plurality of elongate flexible members, each of said elongate flexible members having a first end and a second end, each of said first ends being fixedly coupled to said interior surface of said peripheral wall and positioned generally adjacent to said top edge;

a securing means for removably securing each of said elongate flexible members to said plate, said securing means having a distal portion and a proximal portion, said distal portion having a threaded exterior surface and being removably insertable in said opening in said plate, a nut portion being coupled to said threaded exterior surface of said distal portion, said proximal portion comprising an annular member having a break therein, said break being positioned generally adjacent to said distal portion, wherein said second ends of said elongate flexible members are removably coupled to said proximal portion of said securing means; and a power supply, said power supply extending through said securing means and through said aperture through said dividing wall, said power supply being operationally coupled to said light socket.

\* \* \* \* \*